United States Patent
An et al.

(10) Patent No.: US 9,877,320 B2
(45) Date of Patent: *Jan. 23, 2018

(54) FAST WIRELESS LOCAL AREA NETWORK COMMUNICATION METHOD AND APPARATUS USING MULTIPLE TRANSFER RATE PARTITIONING AND COOPERATIVE TRANSMISSION

(71) Applicant: RESEARCH & BUSINESS FOUNDATION SUNGKYUNKWAN UNIVERSITY, Suwon-si (KR)

(72) Inventors: Dong Hyeok An, Okcheon-gun (KR); Yu Sung Kim, Suwon-si (KR); Ik Jun Yeom, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 234 days.

This patent is subject to a terminal disclaimer.

(21) Appl. No.: 14/450,059

(22) Filed: Aug. 1, 2014

(65) Prior Publication Data
US 2015/0078351 A1    Mar. 19, 2015

(30) Foreign Application Priority Data

Sep. 17, 2013  (KR) .................. 10-2013-0111671
May 8, 2014  (KR) .................. 10-2014-0055079

(51) Int. Cl.
*H04W 72/04*   (2009.01)
*H04W 74/00*   (2009.01)
(Continued)

(52) U.S. Cl.
CPC ....... *H04W 72/0446* (2013.01); *H04W 28/22* (2013.01); *H04W 72/1268* (2013.01);
(Continued)

(58) Field of Classification Search
CPC ... H04J 2203/0091; H04Q 2213/13393; H04L 47/2466; H04L 47/27; H04L 47/41; H04W 28/0294; H04W 74/04; H04W 74/08

See application file for complete search history.

(56) References Cited

U.S. PATENT DOCUMENTS

2004/0264428 A1* 12/2004 Choi .................. H04W 48/08
                                                        370/338
2005/0249117 A1   11/2005 Gerkins
(Continued)

FOREIGN PATENT DOCUMENTS

KR   10-2010-0092618 A    8/2010

OTHER PUBLICATIONS

U.S. Office Action dated Aug. 24, 2016 in counterpart U.S. Appl. No. 15/180,216. (24 pages in English).
(Continued)

*Primary Examiner* — Salvador E Rivas
(74) *Attorney, Agent, or Firm* — NSIP Law

(57) ABSTRACT

A wireless local area network (WLAN) communication method and apparatus using multiple transmission speed partitioning and cooperative transmission are disclosed. The WLAN communication method includes transmitting, by access point to the nodes, transmission time slots, partitions and internal transmission priorities using transmission time slot information, partition information and internal transmission priority information, receiving uplink packet from one node, determining whether downlink data to be transmitted to the high speed or the low speed node is present, or not in the download queue, transmitting, if present, the downlink packet to the nodes, removing downlink data from the download queue for ACK, and transmitting, if not present, transmitting ACK to the nodes.

5 Claims, 12 Drawing Sheets

(51) Int. Cl.
*H04W 72/12* (2009.01)
*H04W 74/08* (2009.01)
*H04W 28/22* (2009.01)
*H04W 84/12* (2009.01)
*H04L 12/18* (2006.01)
*H04W 28/02* (2009.01)

(52) U.S. Cl.
CPC ......... *H04W 74/004* (2013.01); *H04W 74/08* (2013.01); *H04L 12/1872* (2013.01); *H04W 28/0294* (2013.01); *H04W 84/12* (2013.01)

(56) References Cited

U.S. PATENT DOCUMENTS

| | | | | |
|---|---|---|---|---|
| 2007/0280156 A1* | 12/2007 | Kwon | ............... | H04W 74/0816 370/328 |
| 2008/0151848 A1* | 6/2008 | Fischer | ................ | H04W 8/005 370/338 |
| 2008/0192713 A1 | 8/2008 | Mighani et al. | | |
| 2009/0067389 A1* | 3/2009 | Lee | ....................... | H04W 74/02 370/336 |
| 2009/0271512 A1 | 10/2009 | Jorgensen | | |
| 2010/0061350 A1* | 3/2010 | Flammer, III | ........ | H04L 1/1628 370/338 |
| 2010/0135177 A1 | 6/2010 | Liu et al. | | |
| 2011/0103352 A1 | 5/2011 | Wentink | | |
| 2011/0207466 A1* | 8/2011 | Hegge | ................. | H04W 74/002 455/450 |
| 2012/0063433 A1 | 3/2012 | Wentink | | |
| 2013/0028243 A1 | 1/2013 | Wentink et al. | | |
| 2013/0136066 A1 | 5/2013 | Kim et al. | | |
| 2014/0003414 A1* | 1/2014 | Choudhury | ......... | H04W 74/006 370/347 |
| 2014/0226651 A1* | 8/2014 | Lim | ...................... | H04W 84/18 370/350 |

OTHER PUBLICATIONS

U.S. Office Action dated Aug. 24, 2016 in counterpart U.S. Appl. No. 15/180,353. (23 pages in English).

U.S. Office Action dated Jun. 24, 2016, in counterpart U.S. Appl. No. 14/450,059.

* cited by examiner

FAST WIRELESS LOCAL AREA NETWORK COMMUNICATION METHOD AND APPARATUS USING MULTIPLE TRANSFER RATE PARTITIONING AND COOPERATIVE TRANSMISSION

CROSS-REFERENCE TO RELATED APPLICATION(S)

This application claims the benefit under 35 USC 119(a) of Korean Patent Application No. 10-2013-0111671 filed on Sep. 17, 2013, and Korean Patent Application No. 10-2014-0055079 filed on May 8, 2014, in the Korean Intellectual Property Office, the entire disclosures of which are incorporated herein by reference for all purposes.

BACKGROUND OF THE INVENTION

1. Field of the Invention

The present invention relates generally to a wireless local network (WLAN) communication, and, more particularly, to a technique for increasing the speed of WLAN communication.

2. Description of the Related Art

WLAN communication is wireless communication technology based on the IEEE 802.11 standard. Although not supporting mobility, the WLAN communication is widely employed in notebook, smart phone, portable storage device, camera, etc. because the WLAN can efficiently expand a network area wirelessly at a terminal tip of an LAN.

As the number of WLAN-supported devices used in daily life becomes increasingly larger, various problems occur in terms of transfer rate or wireless quality management.

For example, the IEEE 802.11 standard allows wireless communication apparatuses to operate at various transfer rates. Nevertheless, since the equal opportunity to access a channel is provided to all nodes, the performance of high speed transmission nodes that access a corresponding WLAN may be considerably deteriorated if a plurality of devices of relatively low transfer rates accesses the WLAN. This phenomenon is often referred to as performance anomaly.

In order to overcome this problem, time fairness approach that assigns proper transmission time slots to respective nodes, taking into account the size of data, that is, the length of a transmission queue, that should be transmitted by each of the nodes has been proposed.

Furthermore, IEEE 802.11 allows for a plurality of frequency channels. As an increasingly large number of access points and nodes occupy the same space, frequency collision may occur between access points using the same frequency channel. Since a WLAN technology is designed such that a transmitting node should receive an acknowledgement signal indicative of the proper reception of data from a receiving node after transmitting a packet and then transmit the next packet, data transfer rate may be significantly reduced if data is not normally transmitted and received due to frequency collisions.

Meanwhile, a cooperative transmission technique is a communication technique in which a low speed node selects a high speed node as a relay node and allows the relay node to forward its transmission data, thereby overcoming the problem of low transfer rate.

The cooperative transmission technique incurs overhead because a procedure in which a low speed node investigates adjacent nodes, searches for and selects a high speed node that will forward data on behalf of itself, and obtains permission should be undergone. Even a high speed node selected for cooperative transmission cannot overcome the problem of a reduction in transfer rate when a frequency collision occurs, and the improvement of performance cannot be achieved as much as expected if channel access time is not appropriately assigned.

SUMMARY OF THE INVENTION

Accordingly, the present invention has been made keeping in mind the above problems occurring in the prior art, and an object of the present invention is to provide a fast WLAN communication method and apparatus using multiple transfer rate partitioning and cooperative transmission.

In accordance with an aspect of the present invention, there is provided a fast wireless local area network (WLAN) communication method using multiple transfer rate partitioning and cooperative transmission, the method including, by an access point, transmitting transmission time slot information, partition information and internal transmission priority information, used to enable transmission time slots, partitions and internal transmission priorities to be identified, respectively, to nodes, receiving an uplink packet from any one of the nodes, determining whether downlink data to be downloaded to the node is present in a download queue while waiting for a basic waiting time, if downlink data to be transmitted to the node is present, transmitting a downlink packet related to the downlink data to the node after the basic waiting time has elapsed, if a reception acknowledgement packet is received from the node after the downlink packet has been transmitted, removing the downlink data from the download queue and if downlink data to be transmitted to the node is not present, transmitting a reception acknowledgement packet to the node after the basic waiting time has elapsed.

The partition information may be information about at least one partition that is configured to include at least one node set to an equal transfer rate by grouping all of the nodes connected to the access point according to transfer rates.

The transmission time slot information may be information about at least one transmission time slot, which is one of time intervals available for transmission, assigned to each of the partitions grouped according to transfer rates, within a time period between two consecutive beacon frames broadcasted by the access point to the nodes.

The nodes of each of the partitions may operate so as to transmit packets in the assigned transmission time slot in a contention manner.

The internal transmission priority information may be information about priorities with which the nodes belonging to any one of the partitions may transmit the packets in the assigned transmission time slot in a non-contention manner.

The basic waiting time may be set to be equal to a short interframe space (SIFS).

The nodes may include a low speed node being relatively slow, and a high speed node being relatively fast so as to function as relay nodes for the low speed node, the uplink packet is received directly from the high speed node, or via the high speed node from the low speed node, the downlink data is stored in the download queue so as to be downloaded to one of the low speed node and the high speed node, if the downlink packet is transmitted to one of the low speed node and the high speed node, the downlink data is removed from the download queue in response to a reception acknowledgement packet received from one of the low speed node and the high speed node and if the downlink packet to be transmitted is not present in the any node of the low speed nodes and the high speed nodes, the reception acknowledgement packet is transmitted to one of the low speed node and the high speed node from which the uplink packet was transmitted.

The fast WLAN communication method may further include receiving, by a high speed node, which is relatively fast among the nodes, along with the other high speed node belonging to a same partition, a packet from a low speed node which is relatively slow and connected to the access point, when the high speed node receives the packet from the low speed node, determining whether the high speed node is already set as a relay node, if the high speed node has been set as the relay node, forwarding the packet, by the high speed node, after a predetermined basic waiting time has elapsed, if the high speed node has not been set as the relay node, setting a scheduled waiting time, obtained by adding to the basic waiting time an individual waiting time, assigned to each of the high speed nodes, if the forwarding of the packet from other high speed node has been detected by packet listening before the scheduled waiting time has elapsed, discarding, by the high speed node, the packet received from the low speed node and if the forwarding of the packet from other high speed node has not been detected by packet listening until the scheduled waiting time has elapsed, forwarding, by the high speed node, the packet after the high speed node has set itself as a relay node.

The individual waiting time may be set to a corresponding internal transmission priority×a unit waiting time.

The unit waiting time may be set to a value equal to the SIFS; and the scheduled waiting time may be set to (1+the internal transmission priority)×the SIFS.

In accordance with another aspect of the present invention, there is provided a wireless local area network (WLAN) communication apparatus capable of a fast WLAN communication method using a wireless communication module that can be connected to an access point along with WLAN communication apparatuses having a plurality of different transfer rates, the apparatus including a communication control unit configured to identify transmission time slots, partitions and internal transmission priorities using transmission time slot information, partition information and internal transmission priority information, respectively, that are received from the access point, to control transmission/reception of packets via the wireless communication module along with the other WLAN communication apparatuses belonging to a same partition in a specified transmission time slot in a contention manner, or control transmission/reception of packets based on the internal transmission priorities in a non-contention manner, according to a WLAN communication standard, to wait for a predetermined basic waiting time after transmitting an uplink packet to the access point, then to receive a downlink packet or a reception acknowledgement packet, and to, when the downlink packet has been received from the access point, transmit a reception acknowledgement packet to the access point after waiting for the predetermined basic waiting time, and a relay control unit configured to, if a packet is received from a relatively slow WLAN communication apparatus via the communication control unit with request of relaying the packet and the WLAN communication apparatus is set as the relay node, wait for the predetermined basic waiting time after the receiving of the packet from the relatively slow WLAN communication apparatus and then to forward the packet, configured to, if the WLAN communication apparatus has not been set as the relay node, set a scheduled waiting time, obtained by adding the basic waiting time and a predetermined individual waiting time, after the reception of the packet from the relatively slow WLAN communication apparatus, configured to, if forwarding of the packet by another WLAN communication apparatus belonging to a same partition has been detected through packet listening by the communication control unit before the scheduled waiting time elapses, discard the packet received by the communication control unit and configured to, if forwarding of the packet by the other WLAN communication apparatus belonging to the same partition has not been detected until the scheduled waiting time has elapsed, set the WLAN communication apparatus as a relay node, and then to forward the packet via the communication control unit.

The partition information may be information about at least one partition that is configured to include at least one node set to an equal transfer rate by grouping all of the nodes connected to the access point according to transfer rates.

The transmission time slot information may be information about at least one transmission time slot, which is one of time intervals available for transmission, assigned to each of the partitions grouped according to transfer rates, within a time period between two consecutive beacon frames broadcasted by the access point to the nodes.

The nodes of each of the partitions may operate so as to transmit packets in the assigned transmission time slot in a contention manner.

The internal transmission priority information may be information about priorities with which the nodes belonging to any one of the partitions may transmit the packets in the assigned transmission time slot in a non-contention manner.

The relay control unit may be operable to transmit a packet having been requested to be uplink-relayed from the relatively slow WLAN communication apparatus to the access point, to wait for the basic waiting time, to, if a downlink packet supposed to be transmitted from the access point to the relatively slow WLAN communication apparatus is received, wait again for the basic waiting time, and to perform relay transmission of a downlink packet to the relatively slow WLAN communication apparatus.

The basic waiting time may be set to be equal to a short interframe space (SIFS).

The individual waiting time may be set to an internal transmission priority×a unit waiting time.

The unit waiting time may be set to a value equal to the SIFS; and the scheduled waiting time may be set to (1+the internal transmission priority)×the SIFS.

In accordance with still another aspect of the present invention, there is provided an access point device for connecting an internal network, including low speed nodes being relatively slow and high speed nodes being relatively fast so as to function as a relay node for the low speed node, the device comprising: a communication module connected to the internal and external networks according to a predetermined communication protocol, and a communication control unit configured to control uplink transmission and reception directed to the external network and downlink transmission and reception directed to the internal network, and to includes a download queue for storing downlink data to be transmitted from the external network to each of the nodes of the internal network, wherein the communication control unit is operable to: when an uplink packet has been received from the high speed node or via the high speed node from the low speed node, determine whether downlink data to be download to the high speed node or the low speed node is present in the download queue while waiting for a basic waiting time; if downlink data to be download to the high speed node or the low speed node is present in the download queue, transmit the downlink packet to the high speed node after the basic waiting time has elapsed: if a reception acknowledgement packet are received from the high speed or low speed nodes after the downlink packet has been transmitted, remove the downlink data from the download queue; and if downlink data to be transmitted to the high speed or the low speed node is not present in the download queue, transmit a reception acknowledgement packet to the high speed or the low speed node after the basic waiting time has elapsed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
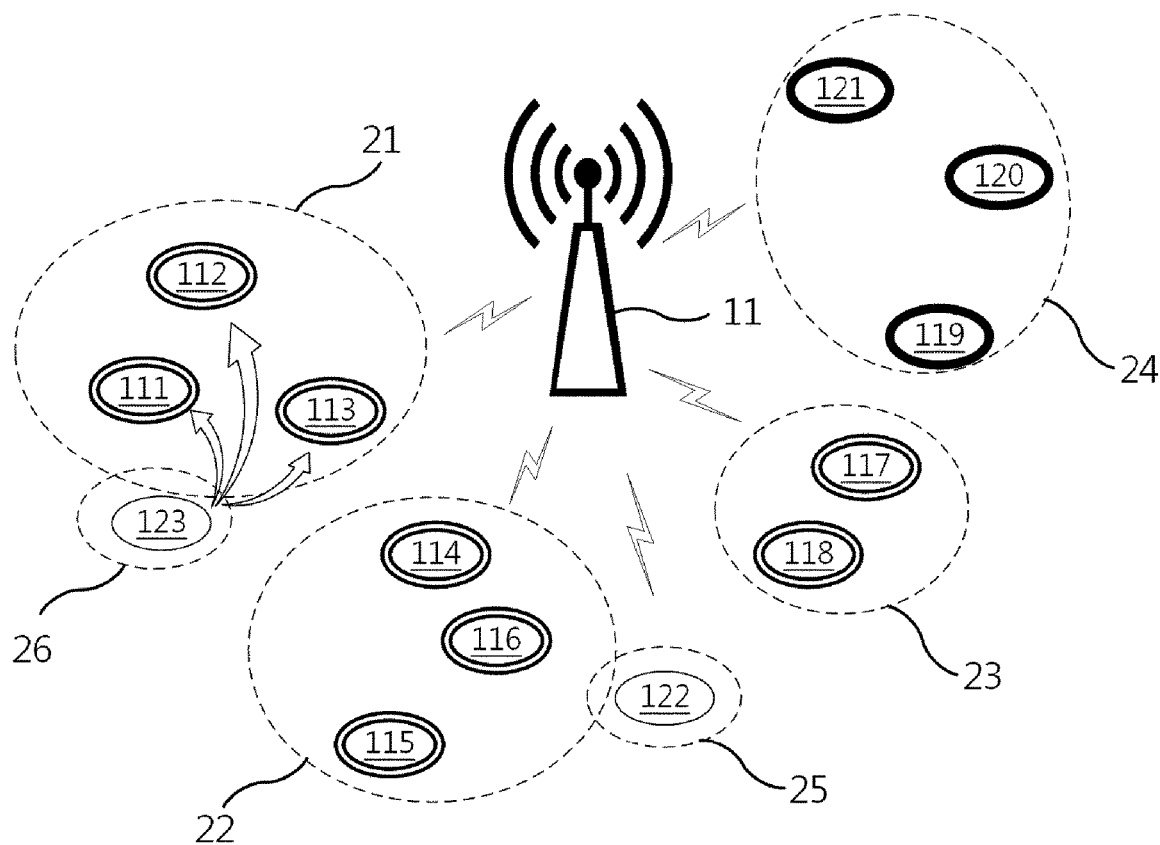
FIG. 1 is a conceptual diagram illustrating a fast WLAN communication method using multiple transfer rate partitioning and cooperative transmission according to an embodiment of the present invention.

Specific structural and functional descriptions of the embodiments of the present invention described herein are given as examples merely to illustrate the embodiments of the present invention. Embodiments of the present invention may be implemented in various ways, and the present invention should not be construed as being limited to the embodiments described herein.

Embodiments of the present invention will be described in detail below with reference to the accompanying drawings. The same reference numerals are assigned to the same components through the drawings, and redundant descriptions of the same components of the drawings will be omitted.

FIG. 1 is a conceptual diagram illustrating a fast WLAN communication method using multiple transfer rate partitioning and cooperative transmission according to an embodiment of the present invention.

Referring to FIG. 1, the fast WLAN communication method using multiple transfer rate partitioning and cooperative transmission can reduce performance anomaly and frequency collisions through the combination of a multiple transfer rate partitioning technique and a cooperative transmission technique that have different purposes and effects.

In FIG. 1, a plurality of nodes 111 to 123 having different transfer rates is connected to an access point AP 11. It is assumed that some nodes of the nodes 111 to 122 are high speed nodes 111 to 118 that have been set to relatively high transfer rates, other nodes are intermediate speed nodes 119 to 121 that have been set to intermediate transfer rates, and the rest are low speed nodes 122 and 123 that have been set to relatively low transfer rates.

At least one partition including at least one node which has been set to the similar transfer rates is configured by grouping, based on the transfer rates, the nodes 111 to 123 connected to the access point 11.

For example, among the high speed nodes 111 to 118 whose transfer rates has been set relatively high, some nodes 111 to 113 may constitute a first partition 21, some other nodes 114 to 116 may constitute a second partition 22, and some other nodes 117 and 118 may constitute a third partition 23.

The intermediate speed nodes 119 to 121 whose transfer rate has been set intermediate constitute a fourth partition 24.

The low speed nodes 122 and 123 whose transfer rate has been set relatively low may constitute independent partitions, respectively. However, in accordance with the WLAN communication method of the present invention, using the cooperative transmission technique, the low speed node 123 whose transfer rate had been set low, having constituted a another partition 26, may request the first partition 21 to relay, and then may be merged with the first partition 21.

A WLAN access point 11 based on IEEE 802.11 outputs beacon frames carrying information about a network at beacon frame intervals.

Operations occurring with respect to uplink traffic in partitions 21 to 26 are described as follows.

During a time period between two consecutive beacon frames, the partitions 21 to 26, divided respectively based on the transfer rates, are allocated to transmission time slots based on the transfer rates. The high speed or low speed nodes 111 to 113, 114 to 116, 117 and 118, 119 to 121, 122, and 123 belonging to the respective partitions 21, 22, 23, 24, 25, and 26 transmit packets within the allocated transmission time slots.

Meanwhile, a plurality of partitions 21 to 23 to each of which has been allocated to the same transmission time slot, due to the same transfer rate may sequentially occupy each part of the transmission time slot according to a predetermined sequence, for example, according to assigned partition numbers, in a non-contention manner without competing with one another.

Further, in an embodiment, the high speed nodes 111 to 113, 114 to 116, and 117 and 118 belonging to the same one among the partitions 21 to 26 may be assigned with transmission sequence from the access point 11 so as to transmit the packets in the sequence of transmission within each of the allocated transmission time slots in a non-contention manner.

In another embodiment, the high speed nodes 111 to 113, 114 to 116, 117 and 118 belonging to the same one among the partitions 21 to 26 may use channels in a contention manner within each of the allocated transmission time slots according to a distributed coordination function (DCF) defined in IEEE 802.11.

Meanwhile, using a cooperative transmission technique, the low speed node 123 belonging to the sixth partition 26, whose transfer rate is a relatively low, may request the first partition 21, to which the one or more high speed nodes 111 to 113 belong, to relay a packet, in the transmission time slot allocated to the sixth partition 26 of the low speed node 123.

The low speed node 123 selects any one partition 21 of the partitions 21 to 24 having relatively high speed as a relay partition, instead of consuming time in selecting a node, to which the relaying of a packet will be requested, among the high speed nodes 111 to 118, and then transmits the packet to all the high speed nodes 111 to 113 of the corresponding partition 21 during the transmission time slot allocated to the sixth partition 26 to which the low speed node 123 belongs.

The high speed nodes 111 to 113 constituting the partition 21 are requested to transmit the packet by receiving the packet to be relayed from the low speed node 123, or a source node. One of the high speed nodes 111 to 113 constituting the partition 21 operate as the relay node. The high speed node 111 set as the relay node forwards the first packet and its subsequent packets, received from the low speed node 123 for the purpose of relaying, to a destination node via the access point 11.

In other words, all of the high speed nodes 111 to 113 constituting the partition 21 set as the relay partition receive the packet to be relayed from the low speed node 123, but only the high speed node 111, one at a time, selected as the relay node from among the high speed nodes 111 to 113 according to predetermined criteria, forwards the packet to a destination node via the access point 11.

Specifically, each of the high speed nodes 111 to 113 discards its own packet if the packet received at the same time for the purpose of relaying from the low speed node 123 has been forwarded by any other high speed node. In contrast, if the high speed node previously operating as the relay node or the other high speed nodes has not forwarded the packet within a predetermined time, each of the high speed nodes 111 to 113 may set itself as the relay node, and then forwards the packet.

More specifically, although the configuration of the partition 21 changes, each of the high speed nodes 111 to 113 constituting the partition 21 cannot become aware of the change in real time, and therefore each of the high speed nodes 111 to 113 cannot determine in real time whether another high speed node having a higher priority than the node itself can function as the relay node.

However, if each of the high speed nodes 111 to 113 constituting the partition 21 is performing packet listening, the high speed node 111, 112 or 113 can determine whether another high speed node having a higher priority than the node itself has forwarded the packet, and can also determine whether cooperative transmission has been completed.

Typically, communication nodes based on IEEE 802.11, after transmitting a packet, wait for a short interframe space (SIFS) time, and then receive a reception acknowledgement signal (ACK). This is designed for taking into account various delay times required to complete the transmission of a packet and to prepare for receiving a subsequent signal. Accordingly, each communication node supporting IEEE 802.11 transmits its packet, waits for the SIFS time, and then performs another operation.

Exploiting this technique, according to the invention, the high speed nodes 111 to 113 may wait for predetermined individual waiting time, and may detect whether another high speed node has forwarded the packet before the individual waiting time elapses.

First, if the low speed node 123 transmits the packet to a relay partition, all of the high speed nodes 111 to 113 belonging to the relay partition receive the packet from the low speed node 123. Each of the high speed nodes 111 to 113 waits and performs listening to other high speed nodes forwarding the requested packet during a waiting time, ranging from a basic waiting time of at least 1*SIFS to a scheduled waiting time which is obtained by adding individual waiting time of each of the high speed nodes to the basic waiting time.

According to an embodiment, each of the individual waiting times may be given as, for example, internal transmission priority×unit waiting time. More specifically, the unit waiting time may be set as SIFS for convenience, although the unit waiting time may be suitably given according to design.

If a high speed node 111 with the highest priority operates normally in the relay partition, the high speed node 111 operates as a relay node and performs packet forwarding.

Although one high speed node 111 among the high speed nodes 111 to 113 in the relay partition 21 has been assigned with highest priority, if, for example, the low speed node 123 has successfully forwarded the packet via the high speed node 112, it may be not necessary to change the relay node to the high speed node 111. Accordingly, the high speed node 111, with the highest priority but without being designated as a relay node, just waits and performs listening during at least the scheduled waiting time, obtained based on, for example, the relationship of the following Equation 1, for example, during a scheduled waiting time of 2×SIFS. If packet forwarding has not been detected until the scheduled waiting time elapsed, the high speed node 111 sets itself as the relay node at last, and forwards the requested packet.

Basic waiting time=1*SIFS

Unit waiting time=1*SIFS

Individual waiting time=internal transmission priority×unit waiting time

Scheduled waiting time=basic waiting time+individual waiting time=(1+internal transmission priority)×SIFS  (1)

In Equation 1, the unit waiting time is given as 1*SIFS as an example, in which case an existing SIFS parameter may be used without introducing another delay time parameter. According to an embodiment, the unit waiting time may be set using an existing delay time parameter or a new delay time parameter without using the SIFS parameter.

If, as a result of the listening during the scheduled waiting time, the high speed node 113 having the next highest priority has detected the packet forwarding by the high speed node 111 having a higher priority, or by the high speed node node 112 currently set as the relay node, the high speed node 113 discards the packet having been received from the low speed node 123. If, as a result of the listening during the scheduled waiting time, that is, at least the basic waiting time+the individual waiting time=1*SIFS+the internal transmission priority*SIFS=3*SIFS, the high speed node 113 having the next highest priority has not detected the packet forwarding by the high speed node 111 or 112 having a higher priority, the high speed node 113 sets itself as the relay node at the time at which a scheduled waiting time of 3*SIFS has elapsed, and forwards the requested packet.

During a relaying operation that is performed after the high speed node 113 has set itself as the relay node, the high speed node 113 does not need to listen to another high speed node 111 or 112 performing relaying any longer, and thus the high speed node 113 immediately forwards the received packet after receiving the packet from the low speed node 123 and then waiting for the basic waiting time of 1*SIFS. When a packet is received from the low speed node 123 later, each of the other high speed nodes 111 and 112, however, preparing for inability of the high speed node 113 as the relay node, listens for an individual waiting time=its corresponding internal transmission priority*the unit waiting time additionally after the basic waiting time, in order to be aware whether the high speed node 113 forwards the packet during the basic waiting time of 1*SIFS, or that any other high speed node 111 or 112 is newly set as the relay node and then initiates the packet forwarding.

In other words, each of all the high speed nodes 111 to 113 of the partition 21, which receive a packet to be relayed from the low speed node 123, waits and performs packet listening for a scheduled waiting time, that is, the basic waiting time+the individual waiting time=1*SIFS+its internal transmission priority*the unit waiting time=(1+its internal transmission priority) SIFS, based on the internal transmission priorities assigned to the respective high speed nodes 111 to 113, then discards the packet it has received from the low speed node 123 and stops the listening, as long as the node itself is not currently set as the relay node.

Each of all the high speed nodes 111 to 113, however, sets itself as the relay node right after elapsing of the scheduled waiting time, that is, the basic waiting time+the individual waiting time=1*SIFS+the internal transmission priority*the unit waiting time, and then forwards the received packet, if, through the listening, it has not detected the packet forwarding from any other high speed node until the scheduled waiting time has elapses.

Examples of changes in assignment of relay nodes include power failure of high speed node 111 performing relaying tasks in a present beacon period, weakening of RF power, or getting out of the partition 21.

Meanwhile, configuration of the partitions and internal transmission priorities may continuously change after each beacon period. With expiration of a previous beacon period and beginning of a new beacon period, another high speed node 112, other than the previous node, may be provided with the highest internal transmission priority. In this case, the high speed node 112, instead of the high speed node 111 that had performed the relaying operation in the previous beacon period, may resume a relaying operation of forwarding a packet received from the low speed node 123.

In this case, as described above, all of the high speed nodes 111 to 113 of the partition 21 has already received the to-be-relayed packet from the low speed node 123, and thus the high speed node 112 newly set as the relay node may immediately forward the received packet to a destination node via the access point 11.

In this manner, the low speed node 123 may rapidly transmit packets during a transmission time assigned to the slow nodes having low transfer rates via the high speed node 111.

Furthermore, since the high speed nodes 111 to 113 are configured to operate in such a smart manner that it autonomously designates itself as the relay node or discards the to-be-relayed packet, based on their internal transmission priorities within the partition, necessarily given by the access point 11 and their scheduled waiting times, it is possible to implement a cooperative transmission technique without using a complicated and cooperative relay node selection algorithm. Since the SIFS time is merely, for example, several to ten-odd μs, the delay caused by further waiting of the high speed node for a plurality of SIFS times is negligible compared to the benefit from relaying packets through a high speed node, instead of a low speed node.

Furthermore, the access point 11 may revoke extra transmission time slot assigned to the partition 26 of the low speed node 123, and may extend the length of a transmission time slot to be assigned to the partitions 21 to 24 having high transfer rates, resulting in improvement in overall transmission performance.

Furthermore, since only the limited number of the nodes 111 to 123 forming a partition may attempt transmission in a contentious or non-contentious manner within a limited transmission time slot, collision delay considerably reduces in the corresponding wireless network and the possibility of frequency collision between other wireless networks also significantly reduces, compared to a conventional case where all nodes within a network or a plurality of nodes having the same transfer rate attempts transmission within a limited transmission time slot in a contention or non-contention manner.

The above operation may be illustrated in conjunction with the drawings below. Although the technical field of a WLAN has been chiefly described as an example, the spirit of the present invention may be easily applied to other wireless communication technologies similar to the WLAN of IEEE 802.11.

Next, operations that are performed in connection with downlink traffic via which data is downloaded to a specific node of a specific partition via the access point 11 from the outside are described.

Normally, in a WLAN environment, uplink traffic and downlink traffic are present in a mixed manner. Since an access point is considered as another single wireless node, a problem occurs that downlink traffic for forwarding data, externally received by the access point, to a specific node of a specific destination partition should be also processed within a transmission time slot that is assigned in the same manner as other partitions.

Accordingly, the fast WLAN communication method using multiple transfer rate partitioning and cooperative transmission according to an embodiment of the present invention gives the access point 11 the priority to downlink transmission to a specific node whenever the access point 11 performs uplink transmission from the specific node to the outside, thereby improving the downlink traffic of the access point 11.

More specifically, when an uplink packet to be transmitted to the outside is transmitted to the access point 11 from a high speed node (for example, the high speed node 111), the WLAN access point 11 transmits the transmitted uplink packet to the outside, and determines whether there is downlink data to be downloaded to the high speed node 111 in a download queue. If there is downlink data to be transmitted to the high speed node 111, the access point 11 transmits the downlink packet to the high speed node 111 prior to uplink transmission of the other nodes.

For example, the access point 11, prior to the high speed nodes 111 and etc., waits only for the basic waiting time, that is, 1*SIFS, and then transmits the corresponding downlink packet to the high speed node 111.

Typically, the high speed node 111 that has transmitted the uplink packet to the access point 11 expects the reception of an ACK packet as a result of the packet transmission. In the above case, the high speed node 111 receives a downlink packet instead of an ACK packet. In other words, the access point 11 transmits a downlink packet instead of an ACK packet.

Furthermore, if there is no downlink data to be downloaded from the access point 11 to the high speed node 111, when an uplink packet to be transmitted to the outside is transmitted to the access point 11 from the high speed node 111, the access point 11 transmits an ACK packet, responsive to the uplink packet, to the high speed node 111.

The high speed node 111 transmits an uplink packet to the access point 11, and then receives an ACK packet or a downlink packet from the access point 11 after waiting for 1*SIFS. In any case, it may be possible to check whether the uplink packet, transmitted from the high speed node 111 itself to the access point 11, has been properly received by the access point 11.

Furthermore, if the high speed node 111 normally receives the downlink packet from the access point 11, the high speed node 111 transmits an ACK packet to the access point 11 after waiting for 1*SIFS.

The access point 11 may remove the downlink data from the download queue after receiving the ACK packet from the high speed node 111.

In a similar manner, downlink traffic related to the low speed node 123 can be improved upon cooperative transmission.

The high speed node 111 set as the relay node for the low speed node 123 may transmit an uplink packet, relayed from the low speed node 123 to the outside, to the access point 11.

After only waiting for the basic waiting time, that is, 1*SIFS, the high speed node 111 may receive a downlink packet, to be downloaded to the low speed node 123 or to high speed node 111 itself, or an ACK packet, responsive to the previously transmitted uplink packet, from the access point 11.

In the case, the WLAN access point 11, when receiving the uplink packet to be transmitted to the outside from the low speed node 123 via the high speed node 111, transmits the transmitted uplink packet to the outside, and determines whether the downlink data to be downloaded to at least one of the low speed node 123 and the high speed node 111 is present in a download queue. If the downlink data to be transmitted to the one of the low speed node 123 and the high speed node 111 is present, the access point 11 waits for the basic waiting time, that is, 1*SIFS, and then transmits the downlink packet prior to another node.

If the downlink data to be downloaded to the one of the low speed node 123 and the high speed node 111 is not present, the access point 11 may transmit the ACK packet to the low speed node 123 and the high speed node 111 as an acknowledgement of the reception of the uplink packet.

Thereafter, if the high speed node 111 normally receives the downlink packet to be transmitted to the low speed node 123 from the access point 11, the high speed node 111 waits only for the basic waiting time, that is, 1*SIFS, and then relays the downlink packet to the low speed node 123.

The low speed node 123 receives the downlink packet through the relaying of the high speed node 111, and may then transmit the ACK packet directly to the access point 11, without the relaying of the high speed node 111, after waiting for the basic waiting time, that is, 1*SIFS.

The access point 11 may remove the downlink data from the download queue after receiving the ACK packet from the low speed node 123.

Figure 2:
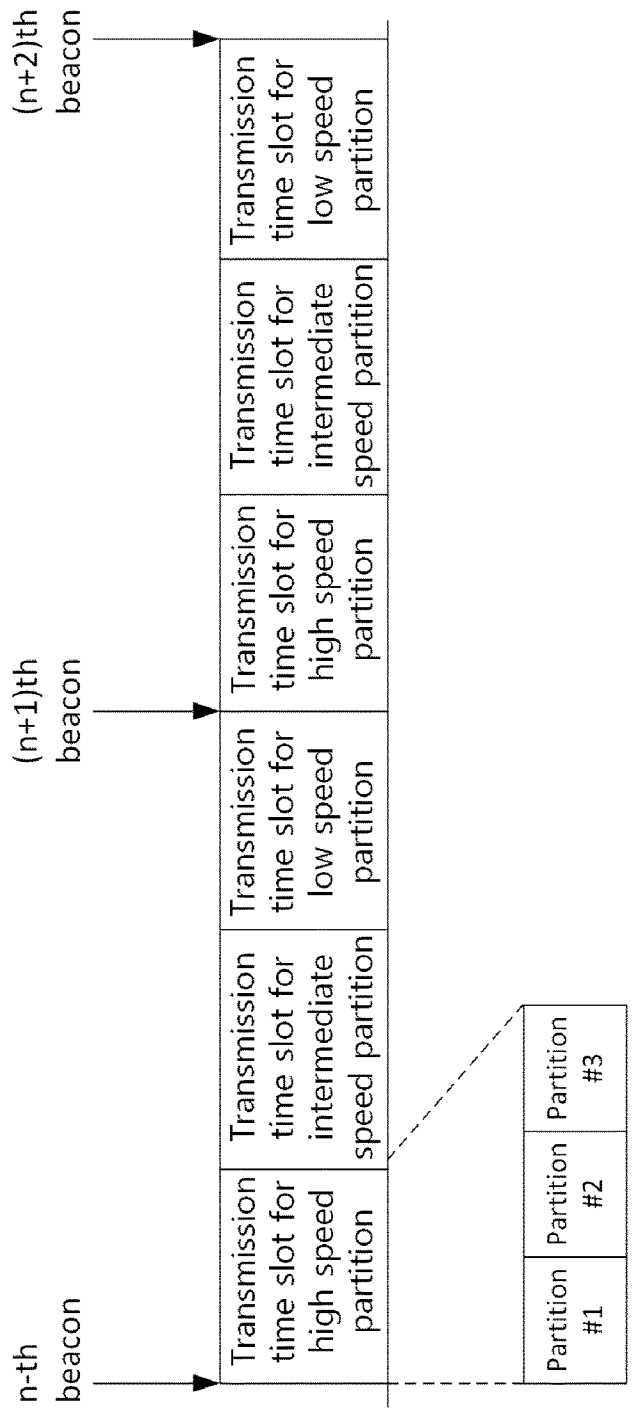
FIG. 2 is a conceptual diagram illustrating division of the transmission time slots of each of the partitions in the fast WLAN communication method using multiple transfer rate partitioning and cooperative transmission according to an embodiment of the present invention.

FIG. 2 is a conceptual diagram illustrating the division of the transmission time slot of each of the partitions in the fast WLAN communication method using multiple transfer rate partitioning and cooperative transmission according to an embodiment of the present invention.

Referring to FIG. 2, two beacon periods are illustrated between three consecutive beacon frame signals. Each of the beacon periods has three transmission time slots for partitions having high speed transfer rates, intermediate transfer rates and low speed transfer rates, respectively.

Furthermore, one or more partitions having the same transfer rate that should share each of the transmission time slots may occupy at least part of the transmission time slot in a contention or non-contention manner.

If the partitions occupy the transmission time slot in a non-contention manner, the partitions may be, for example, provided with occupation sequence according to the partition numbers in the transmission time slot.

Figure 3:
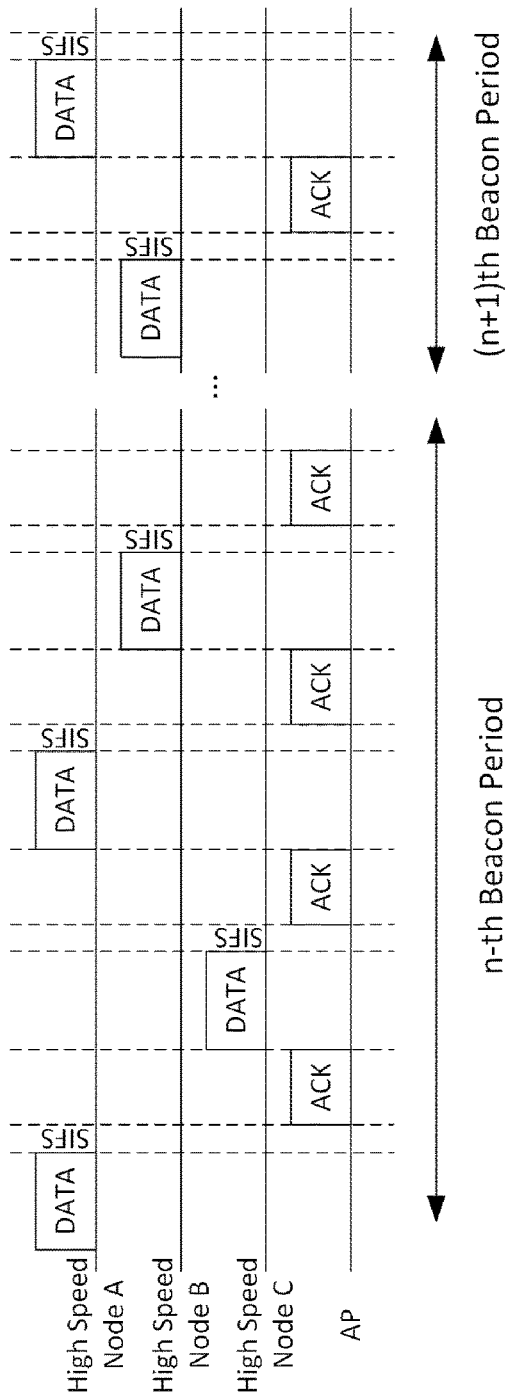
FIG. 3 is a conceptual diagram illustrating internal transmission priorities for each of the transmission time slots of high speed nodes in a partition in the fast WLAN communication method using multiple transfer rate partitioning and cooperative transmission according to an embodiment of the present invention.

FIG. 3 is a conceptual diagram illustrating internal transmission priorities for each of the transmission time slots in the fast WLAN communication method using multiple transfer rate partitioning and cooperative transmission according to an embodiment of the present invention.

Referring to FIG. 3, in an n-th beacon period, high speed nodes A, B and C belonging to a specific partition have been given internal transmission priorities, in the order of high speed node A, high speed node C and high speed node B, respectively, by the access point AP.

In an (n+1)-th beacon period, the high speed nodes A, B and C have been given reordered internal transmission priorities, respectively, in the order of high speed node B, high speed node A and high speed node C.

These internal transmission priorities are used as criteria for selecting a relay node, among high speed nodes, that will perform cooperative transmission when the cooperative transmission is requested by a low speed node.

Figure 4:
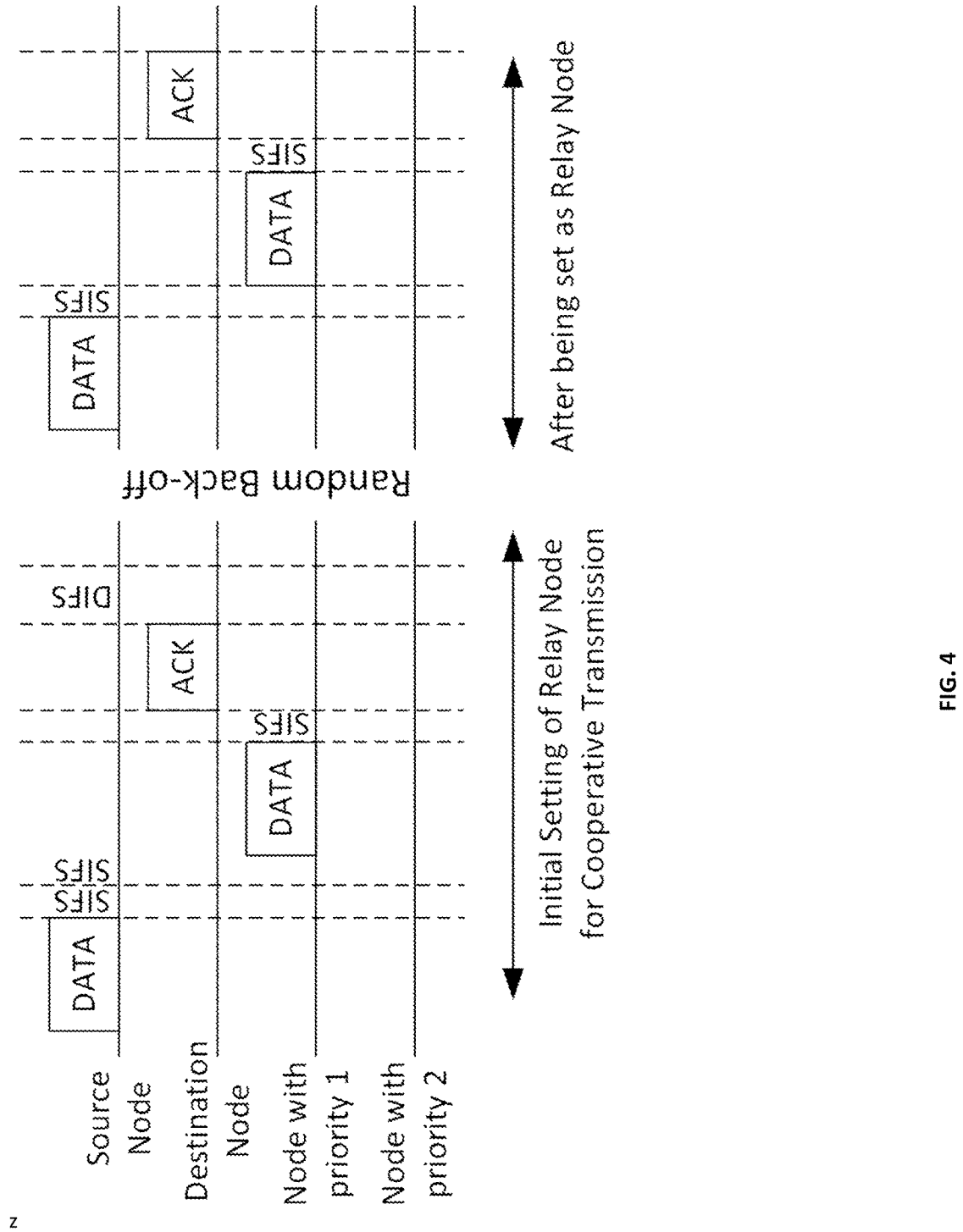
FIG. 4 is a conceptual diagram illustrating setting of a high speed node having the highest internal transmission priority as a relay node and first packet transmission and subsequent packet transmission through the set relay node in the fast WLAN communication method using multiple transfer rate partitioning and cooperative transmission according to an embodiment of the present invention.

FIG. 4 is a conceptual diagram illustrating the setting of a high speed node having the highest internal transmission priority as a relay node, and first packet transmission and subsequent packet transmission through the set relay node in the fast WLAN communication method using multiple transfer rate partitioning and cooperative transmission according to an embodiment of the present invention.

Referring to FIG. 4, illustrated is a technique for a low speed node, which is a source node of packets and wants to transmit packets to a destination node, to facilitate a high speed node connected to the same access point as a relay node.

The low speed node, that is a source node, requests cooperative transmission through transmitting to-be-relayed packet to all of the high speed nodes, during a transmission time slot when the low speed node occupies a transmission channel. Of course, an optional procedure of the low speed source node transmitting a request to send (RTS) packet and then receiving a clear to send (CTS) packet to the high speed nodes may precede the transmission of the to-be-relayed data packet.

If the packet had been received from the low speed node at the high speed nodes, each of the high speed nodes performs packet listening adapted to detect whether any other high speed node performs the forwarding of the packet, while waiting for a corresponding scheduled waiting time, that is, the basic waiting time+a corresponding individual waiting time=1*SIFS+a corresponding internal transmission priority*the unit waiting time=(1+the internal transmission priority)*SIFS, immediately after the reception of the packet. Since no high speed node is operating as a relay node in current situation, a high speed node having an internal transmission priority of "1", or highest priority, sets itself as a relay node at the time at which a scheduled waiting time of 2*SIFS has elapsed, and then, as a relay node, immediately forwards the packet to the destination node via the access point.

It is expected that another high speed node having a priority of "2" performs listening while waiting for a corresponding scheduled waiting time, that is, the basic waiting time+a corresponding individual waiting time=1*SIFS+a corresponding internal transmission priority*the unit waiting time=3*SIFS. However, since forwarding the packet from the high speed node having a priority of "1" is detected during a third SIFS, the high speed node having a priority of "2" discards the packet received from the low speed node at the time at which a scheduled waiting time of 3*SIFS has elapsed.

Meanwhile, each of the nodes may receive an ACK signal output from the destination node, may wait for a DCF interframe space (DIFS) time, and may attempt the next transmission of a subsequent packet.

After the high speed node having a priority of "1" has been set as a relay node, the low speed node that is a source node may also transmit a packet to be newly relayed to all of the high speed nodes of the partition after waiting for a random back-off delay time according to the IEEE 802.11 standard.

Next, the high speed node having a priority of "1" performs the packet forwarding as a relay node after waiting only for a basic waiting time of 1*SIFS, instead of waiting for a scheduled waiting time, that is, the basic waiting time+a corresponding individual waiting time=1*SIFS+a corresponding internal transmission priority*the unit waiting time=(1+the internal transmission priority)*SIFS=2*SIFS.

In this case, the high speed node having a priority of "2" also has received the packet from the low speed node that is a source node. It is scheduled that the high speed node having a priority of "2" performs listening during a corresponding scheduled waiting time, that is, the basic waiting time+a corresponding individual waiting time=1*SIFS+a corresponding internal transmission priority*the unit waiting time=(1+the internal transmission priority)*SIFS=3*SIFS. However, if the high speed node having a priority of "1" that is a relay node normally performs the packet forwarding, the packet forwarding by the high speed node having a priority of "1" is detected in a time period of a second SIFS, and therefore the high speed node having a priority of "2" discards the packet received from the low speed node at that detection.

Figure 5:
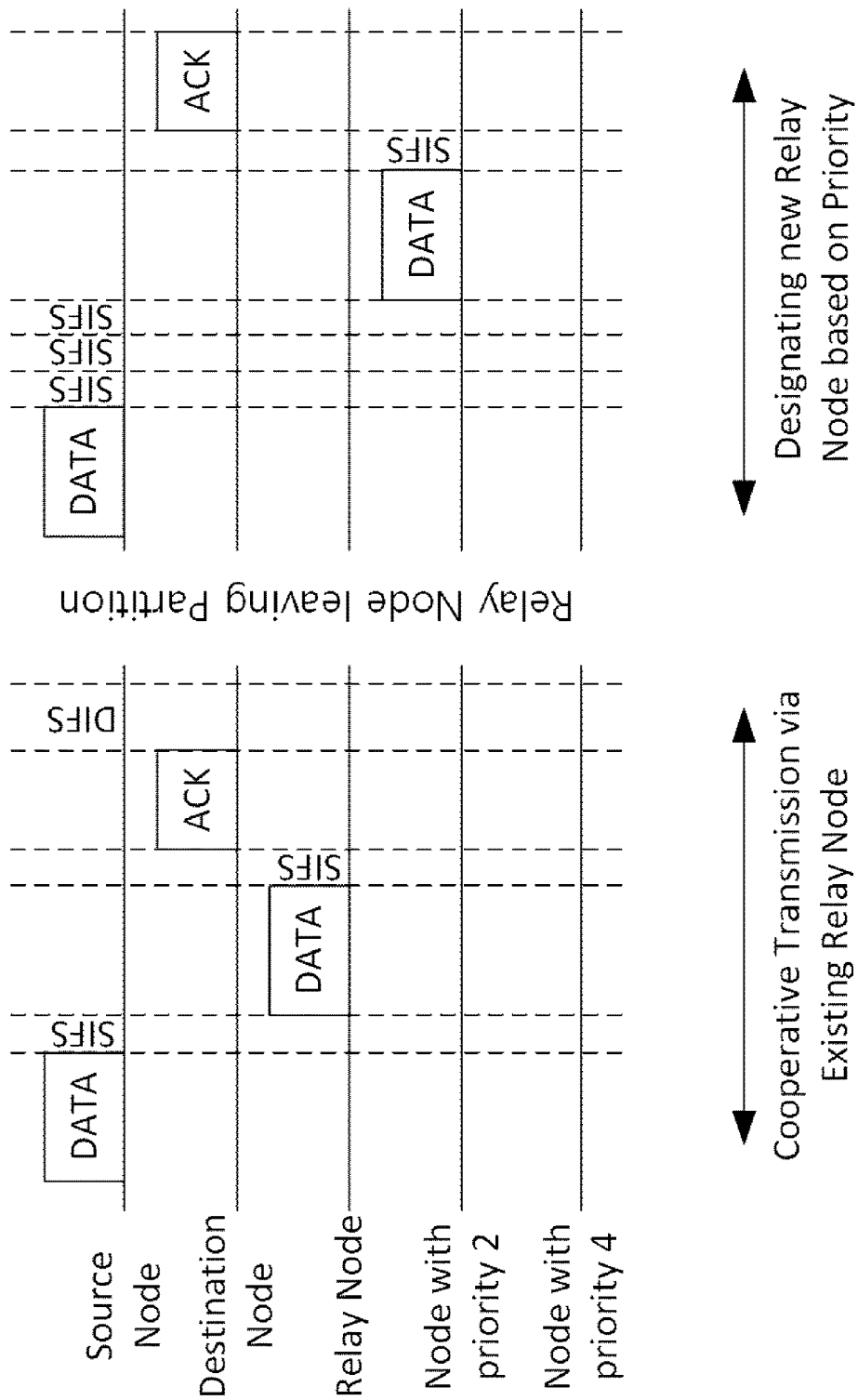
FIG. 5 is a conceptual diagram illustrating setting of a subsequent relay node and the transmission of a packet that are performed when a current relay node stops its operation in the fast WLAN communication method using multiple transfer rate partitioning and cooperative transmission according to an embodiment of the present invention.

FIG. 5 is a conceptual diagram illustrating the setting of a subsequent relay node and the transmission of a packet that are performed when a current relay node stops its operation in the fast WLAN communication method using multiple transfer rate partitioning and cooperative transmission according to an embodiment of the present invention.

Referring to FIG. 5, a partition includes a plurality of high speed nodes. Among these high speed nodes, some high speed nodes adjacent to a low speed node that is a source node include a high speed node previously set as a relay node and high speed nodes having internal transmission priorities of "2" and "4," respectively.

When the incumbent relay node receives a packet from the low speed node, the incumbent relay node waits only for a basic waiting time of 1*SIFS, and then performs the packet forwarding.

Similarly, it is expected that when the high speed nodes having internal transmission priorities of "2" and "4" receive the packet from low speed node, these high speed nodes perform packet listening while waiting for a scheduled waiting time of 3*SIFS or 5*SIFS regardless of the presence or operation of the existing relay node.

Since the existing relay node performs the packet forwarding immediately after the basic waiting time of 1*SIFS has elapsed, the high speed nodes having internal transmission priorities of "2" and "4" detect the packet forwarding during a time period of second SIFS, and discard the packet received from the low speed node.

If a network environment has changed and then the previous relay node has moved out of the partition, when the high speed nodes having internal transmission priorities of "2" and "4" receive a packet from the low speed node it is scheduled that high speed nodes also perform the packet listening while waiting for the scheduled waiting time of 3*SIFS or 5*SIFS, that is, the basic waiting time+a corresponding individual waiting time, regardless of the presence or operation of the existing relay node.

If the high speed node having an internal transmission priority of "2" has not detected the packet forwarding during the scheduled waiting time, that is, the basic waiting time+a corresponding individual waiting time=1*SIFS+a corresponding internal transmission priority*the unit waiting time=(1+the internal transmission priority)*SIFS=2*SIFS, the high speed node becomes aware of the operation failure of the previous relay node. If the high speed node having an internal transmission priority of "2" has not detected the packet forwarding even during a time period of 3*SIFS in which the high speed node having priority of "1" is expected to perform the forwarding of the packet, the high speed node having priority of "2" becomes aware that the high speed node having priority of "1" does not operate as a relay node, too.

Thereafter, the high speed node having an internal transmission priority of "2" performs the packet forwarding and, at the same time, sets itself as a relay node.

If the high speed node having an internal transmission priority of "5" detects the packet forwarding by the high speed node having an internal transmission priority of "2" immediately after the time period of 3*SIFS, that falls within its own example scheduled waiting time, has elapsed, the high speed node having an internal transmission priority of "5" stops packet listening, and then discards the received packet.

Figure 6:
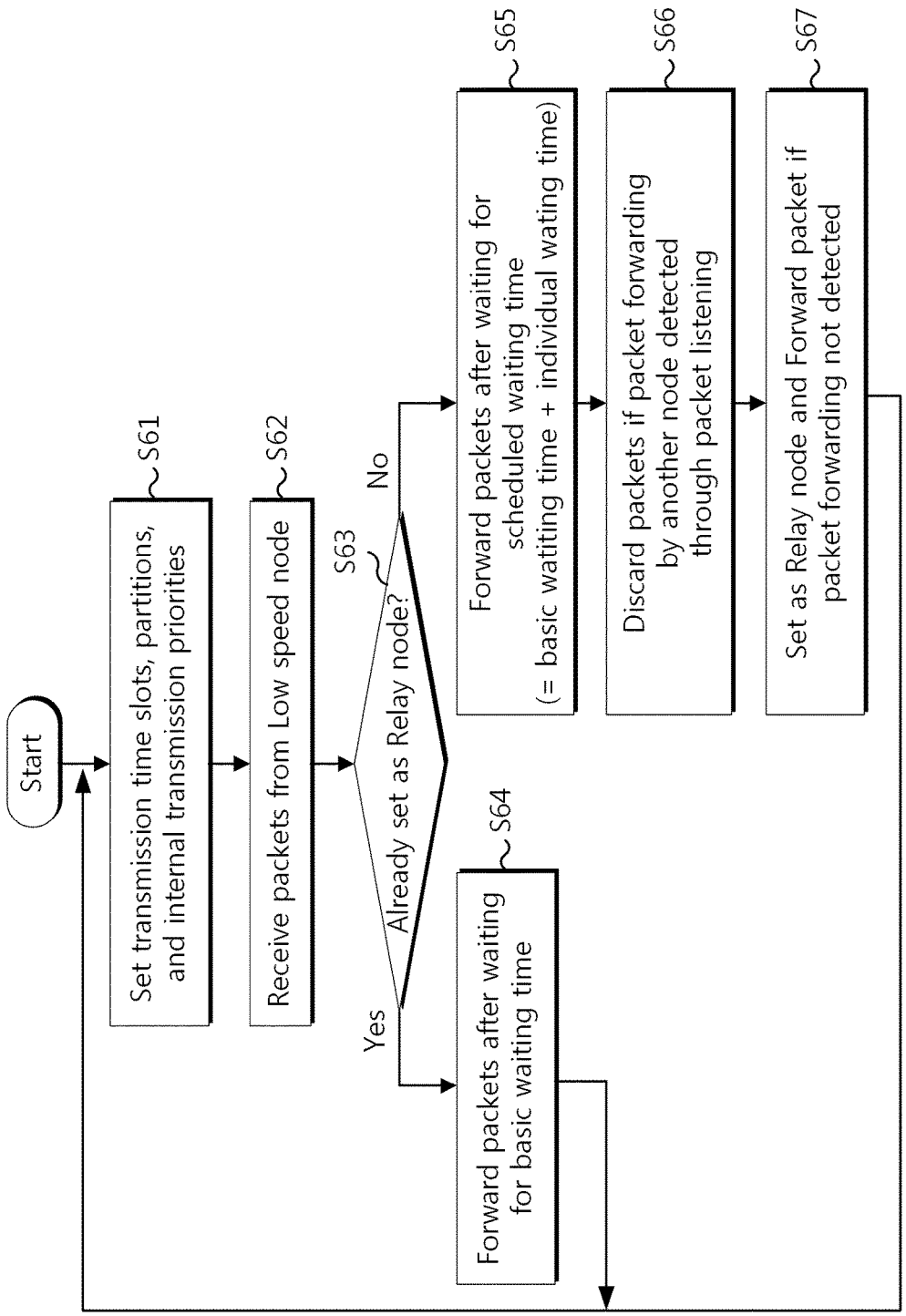
FIG. 6 is a flowchart illustrating a fast WLAN communication method using multiple transfer rate partitioning and cooperative transmission according to an embodiment of the present invention.

FIG. 6 is a flowchart illustrating a fast WLAN communication method using multiple transfer rate partitioning and cooperative transmission according to an embodiment of the present invention.

Referring to FIG. 6, in the fast WLAN communication method using multiple transfer rate partitioning and cooperative transmission, first, at step S61, the high speed nodes 111 to 118 and the low speed nodes 121 to 123 identify individually transmission time slots, partitions and internal transmission priorities based on a transmission time slot information, a partition information and an internal transmission priority information received from the access point 11.

The partition information is an information about at least one partition that is configured to include at least one node set to the equal transfer rate, by grouping every node 111 to 123 connected to the access point 11 according to transfer rates.

The transmission time slot information is an information about at least one transmission time slot, as one of time intervals available for transmission within a time period between two consecutive beacon frames, assigned to each of the partitions 21 to 26 grouped according to transfer rates.

The nodes 111 to 113, 114 to 116, 117 and 118, 119 to 121, 122, and 123 belonging to partitions, respectively, may transmit respective packets in the assigned transmission time slot in a contention or non-contention manner.

Furthermore, the internal transmission priority information is an information about priorities with which the nodes 111 to 113, 114 to 116, 117, and 118 belonging to any one of the partitions 21 to 26 may transmit the packets in the assigned transmission time slot in a non-contention manner.

Meanwhile, at step S62, the high speed node 111 to 118 receives packets from the low speed node 122 or 123 connected to the access point 11 along with other high speed nodes belonging to the same partition for the cooperative transmission.

At step S63, the high speed node 111 to 118 determines whether it has been already set as a relay node at the time of the high speed nodes 111 to 118 receiving packets from the low speed node 122 or 123. According to the result, the process proceeds to step S64 if the high speed node 111 to 118 has already been set as a relay node, while the process proceeds to step S65 if the high speed node 111 to 118 has not yet been set as a relay node.

If it is determined at step S63 that a high speed node having received packets from a low speed node has been set as a relay node, the high speed node set as a relay node may wait for a predetermined basic waiting time, for example, 1*SIFS, after receiving the packet from the low speed node and then perform the packet forwarding at step S64.

If it is determined at step S63 that the high speed node having received packets from the low speed node has not been set as a relay node, the high speed node may set a scheduled waiting time, by adding the basic waiting time to a corresponding individual waiting time (for example, assigned to each of the high speed nodes according to internal transmission priorities), at step S65 after receiving packets from the low speed node.

More specifically, the scheduled waiting time may be set as by the following equation: the scheduled waiting time=the basic waiting time+an individual waiting time=1*SIFS+a corresponding internal transmission priority*the unit waiting time=(1+the internal transmission priority)*SIFS.

At step S66, when the corresponding high speed node has detected the packet forwarding by another high speed node before the scheduled waiting time elapses through packet listening adapted to detect whether any other high speed node performs the packet forwarding, the corresponding high speed node discards the packet received by itself.

At step S67, when the corresponding high speed node has not detected the forwarding of the packet by another high speed node until the scheduled waiting time has elapsed through packet listening, the corresponding high speed node sets itself as a relay node, and then performs the packet forwarding.

If the packet has been discarded at step S66 or if the packet forwarding has been performed at step S67, the high speed node may receive an ACK signal from a destination node after the SIFS time has elapsed. After the ACK signal has been received and the SIFS time has elapsed, the high speed node becomes ready to transmit its own packet or to newly receive a packet to be relayed from the low speed node.

Figure 7:
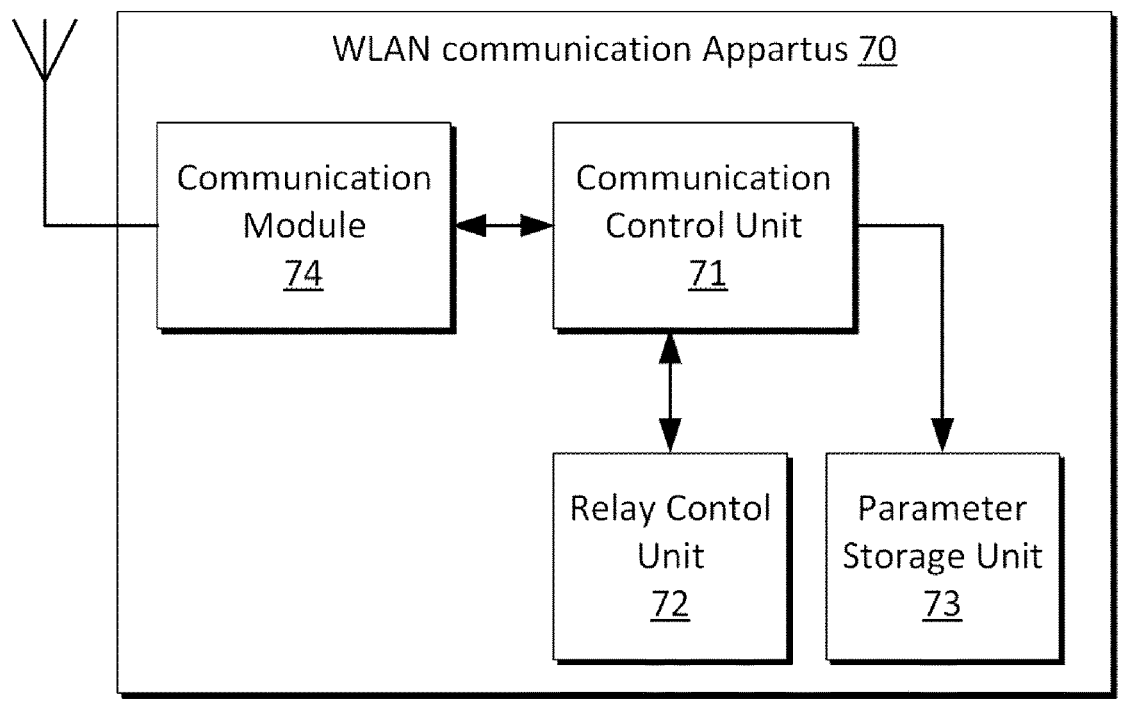
FIG. 7 is a block diagram illustrating a WLAN communication apparatus capable of fast WLAN communication using multiple transfer rate partitioning and cooperative transmission according to an embodiment of the present invention.

FIG. 7 is a block diagram illustrating a WLAN communication apparatus capable of fast WLAN communication using multiple transfer rate partitioning and cooperative transmission according to an embodiment of the present invention.

Referring to FIG. 7, the WLAN communication apparatus 70 may include a communication control unit 71, a relay control unit 72, a parameter storage unit 73, and a wireless communication module 74.

The communication control unit 71 controls the transmission and reception of a packet via the communication module 74 according to a WLAN communication standard.

More specifically, the communication control unit 71 identifies a transmission time slot, a partition, and an internal transmission priority based on a transmission time slot information, a partition information, and an internal transmission priority information received from the an access point 11, respectively. Further, the communication control unit 71 controls the transmission and reception of packets, according to the WLAN communication standard, via the wireless communication module 74 along with other WLAN communication apparatuses belonging to the same partition in specified transmission time slot in a contention manner, or controls the transmission and reception of packets via the wireless communication module 74 based on internal transmission priorities in a non-contention manner.

Further, the communication control unit 71 may wait for a predetermined basic waiting time, for example, 1*SIFS time, after transmitting an uplink packet to the access point 11, and may then receive a downlink packet or an ACK packet from the access point 11, responsive to reception of the uplink packet by the access point 11.

In this case, when receiving a downlink packet related to a corresponding WLAN communication apparatus from the access point 11, the communication control unit 71 may wait for the predetermined basic waiting time, for example, 1*SIFS time, and may then transmit an ACK packet to the access point 11.

The relay control unit 72, responsive to reception of packets and request of the packet relaying from a relatively low speed WLAN communication apparatus, via the communication control unit 71, waits for the predetermined basic waiting time, for example, 1*SIFS time, and then performs the packet forwarding via the communication control unit 71 if a setting as the relay node has been already made. If a setting as the relay node has been already made, the relay control unit 72 sets the scheduled waiting time obtained by adding the basic waiting time and a predetermined individual waiting time, after reception of the packet from WLAN communication apparatus having a low speed. When the relay control unit 72 has detected the packet forwarding from another WLAN communication apparatus, belonging to the same partition, through the packet listening of the communication control unit before the scheduled waiting time elapses, the relay control unit 72 may discard the packet received at the communication control unit 71. When the relay control unit 72 has not detected the packet forwarding of another WLAN communication apparatus belonging to the same partition until the scheduled waiting time elapses, the relay control unit 72 makes a setting itself as the relay node, and then may perform the packet forwarding via the communication control unit 71.

According to an embodiment, an individual waiting time may be assigned to each of the WLAN communication apparatuses, for example, according to the internal transmission priorities, and may be assigned as its internal transmission priority*a unit waiting time, where the unit waiting time may be the same as SIFS.

Furthermore, the scheduled waiting time is the basic waiting time+a individual waiting time, and may be set to 1*SIFS+the internal transmission priority*the unit waiting time=1+the internal transmission priority*SIFS.

According to an embodiment, the relay control unit 72 may transmit a requested uplink-relay packet to the access point 11, and then after waiting for a predetermined basic waiting time, for example, 1*SIFS time, may receive from the access point 11 an ACK packet or a downlink packet to be downlink-relayed to the WLAN communication apparatus having a low speed that has requested the uplink relay.

In this case, when receiving the downlink packet to be downlink-relayed, the relay control unit 72 waits for the predetermined basic waiting time, for example, 1*the SIFS time, and may perform the relay transmission of the downlink packet to the WLAN communication apparatus having a low speed.

Meanwhile, the parameter storage unit 73 stores the transmission time slot information, the partition information and the internal transmission priority information that have been received.

Figure 8:
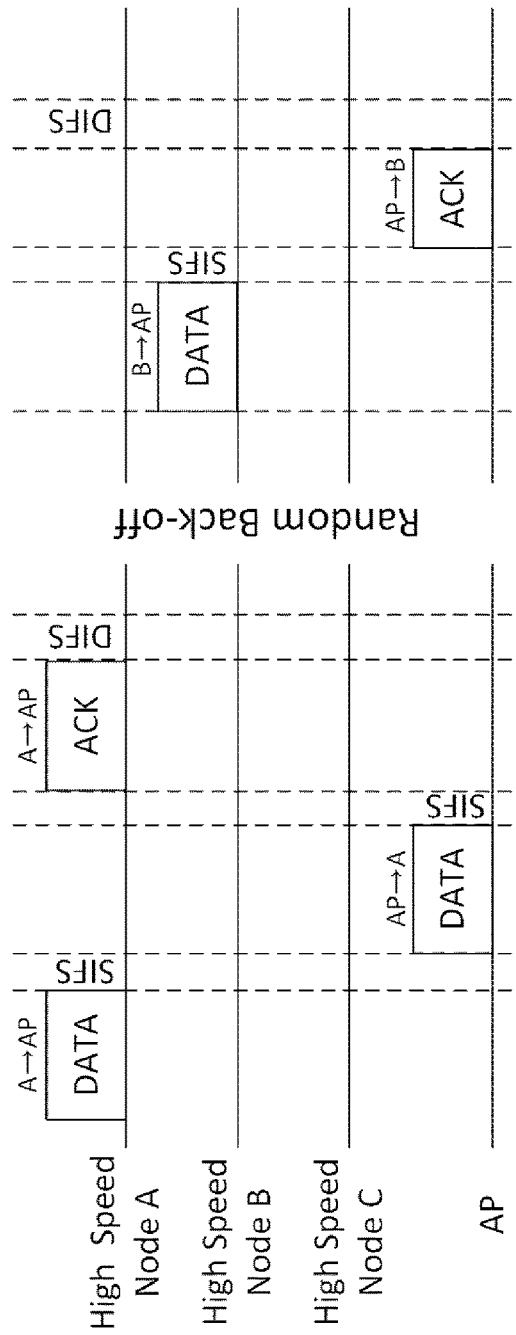
FIG. 8 is a conceptual diagram illustrating the downlink transmission of an access point AP using multiple transfer rate partitioning and cooperative transmission according to an embodiment of the present invention.

FIG. 8 is a conceptual diagram illustrating the downlink transmission of an access point using multiple transfer rate partitioning and cooperative transmission according to an embodiment of the present invention.

Referring to FIG. 8, in a specific beacon period, high speed nodes A, B and C belonging to a specific partition are provided with each of internal transmission priorities, respectively, by an access point AP in the order of the high speed node A, the high speed node B and the high speed node C.

Commonly, in a WLAN environment, uplink traffic and downlink traffic are used in mixed manner. In other words, the nodes may transmit predetermined uplink packets to an external network, and may receive downlink data from an external web server in order to connect with a specific web site.

Accordingly, the fast WLAN communication method using multiple transfer rate partitioning and cooperative transmission according to an embodiment of the present invention attempts to increase the downlink traffic of the access point AP by giving priority to the downlink transmission of the access point AP to the specific node whenever the access point AP performs uplink transmission from the specific node to the outside.

In FIG. 8, first, the high speed node A having the highest internal transmission priority transmits the uplink packet, to be transmitted to the outside, to the access point AP.

The access point AP, receiving the uplink packet from the high speed node A, determines whether downlink data to be downloaded to the high speed node A is present in a download queue while waiting for the basic waiting time, that is, 1*SIFS. Meanwhile, the uplink packet may be output to the outside according to a suitable communication protocol at a suitable time.

Since the downlink data to be transmitted to the high speed node A is present at the access point AP, the access point AP transmits the downlink packet to the high speed node A, prior to another node, instead of waiting for its assigned transmission time slot, after the basic waiting time, that is, 1*the SIFS waiting time, has elapsed.

Meanwhile, since the high speed node A should first receive an ACK packet before transmitting an additional uplink packet even when the high speed node A has the uplink packet to be additionally transmitted, after transmitting the first uplink packet to the access point AP, the high speed node A does not transmit the additional uplink packet before receiving the ACK packet, or a downlink packet equivalent to the ACK packet from the access point AP. Accordingly, there is no concern about a conflict of the high speed node A with the access point AP, after the high speed node A transmitting a first uplink packet and waiting for 1*SIFS time.

The high speed node A receives the downlink packet, recognizes the reception of the downlink packet as the reception of a reception acknowledgement packet responsive to the uplink packet that has been transmitted by the high speed node A, and then transmits an ACK packet responsive to the received downlink packet to the access point AP.

The access point AP may remove the downlink data from the download queue after receiving the ACK packet from the high speed node A.

Accordingly, the access point AP performs downlink transmission in its own assigned downlink transmission time slot and further performs downlink transmission, whenever each of the high speed nodes performs uplink transmission, to the corresponding high speed nodes, thereby increasing the opportunities of transmission and downlink traffic.

The high speed node B having the next highest transmission priority becomes aware that uplink transmission of the high speed node A has completed without any problem, through the reception acknowledgement packet, waits for a predetermined random back-off delay time, and then transmits its own uplink packet to the access point AP.

The access point AP determines whether the downlink data to be downloaded to the high speed node B is present in the download queue while receiving the uplink packet of the high speed node B and waiting for the basic waiting time, that is, 1*SIFS.

When the downlink data to be transmitted to the high speed node B is not present at the access point AP, the access point AP transmits the ACK packet to the high speed node B after the basic waiting time, that is, 1*the SIFS waiting time, has elapsed.

The high speed node B receives a reception acknowledgement packet responsive to the uplink packet transmitted by itself from the access point AP, and then terminates uplink transmission.

The operations of the high speed node B and the access point AP are not different from common uplink transmission operations.

Figure 9:
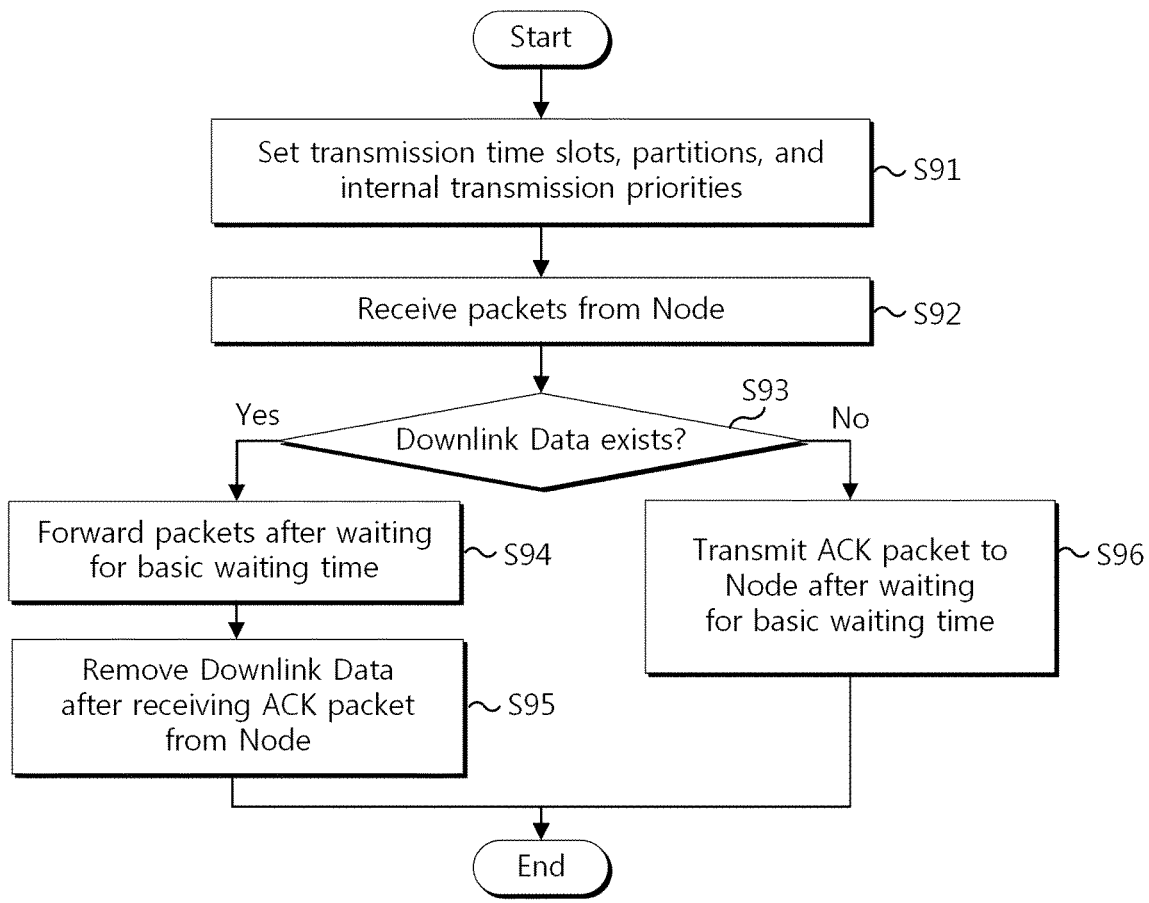
FIG. 9 is a flowchart illustrating a fast WLAN communication method capable of increasing the amount of downlink transmission of an access point using multiple transfer rate partitioning and cooperative transmission according to an embodiment of the present invention.

FIG. 9 is a flowchart illustrating a fast WLAN communication method capable of increasing the amount of downlink transmission of the access point using multiple transfer rate partitioning and cooperative transmission according to an embodiment of the present invention.

Referring to FIG. 9, in accordance with a fast WLAN communication method capable of increasing the amount of downlink transmission of the access point using multiple transfer rate partitioning and cooperative transmission, first, at step S91, the access point 11 may transmit a transmission time slot information, a partition information and an internal transmission priority information to the high speed nodes 111 to 118 and the low speed nodes 121 to 123 in order to enable transmission time slots, partitions and internal transmission priorities to be identified.

The partition information is an information about at least one partition that is configured to include at least one node set to the equal transfer rate, by the access point 11 to group every node 111 to 123 connected to the access point 11 according to transfer rates.

The transmission time slot information is an information about at least one transmission time slot, as one of time intervals available for transmission within a time period between two consecutive beacon frames, assigned to each of the partitions 21 to 26 grouped according to transfer rates.

The nodes 111 to 113, 114 to 116, 117 and 118, 119 to 121, 122, and 123 belonging to partitions, respectively, may transmit respective packets in the assigned transmission time slot in a contention or non-contention manner.

Furthermore, the internal transmission priority information is an information about priorities with which the nodes 111 to 113, 114 to 116, 117, and 118 belonging to any one of the partitions 21 to 26 may transmit the packets in the assigned transmission time slot in a non-contention manner.

Meanwhile, at step S92, the access point 11 receives an uplink packet from any one node, for example, the high speed node 111.

At step S93, the access point 11 determines whether downlink data to be downloaded to the high speed node 111 is present in a download queue while waiting for the basic waiting time, for example, 1*SIFS.

The process proceeds to step S94 if the access point 11 has the downlink data to be transmitted to the high speed node 111, whereas the process proceeds to step S96 if the access point 11 does not have the downlink data to be transmitted to the high speed node 111.

If it is determined at step S93 that the downlink data to be transmitted to the high speed node 111 is present at the access point 11, the access point 11 transmits the downlink packet to the high speed node 111 after the basic waiting time has elapsed at step S94.

At step S95, the access point 11 may remove the downlink data from the download queue if the access point 11 has transmitted the downlink packet and, after waiting for the basic waiting time, for example, 1*SIFS, received the reception acknowledgement packet from the high speed node 111.

If it is determined at step S93 that the downlink data to be transmitted to the high speed node 111 is not present at the access point 11, the access point 11 transmits the reception acknowledgement packet to the high speed node 111 after the basic waiting time has elapsed at step S96.

Figure 10:
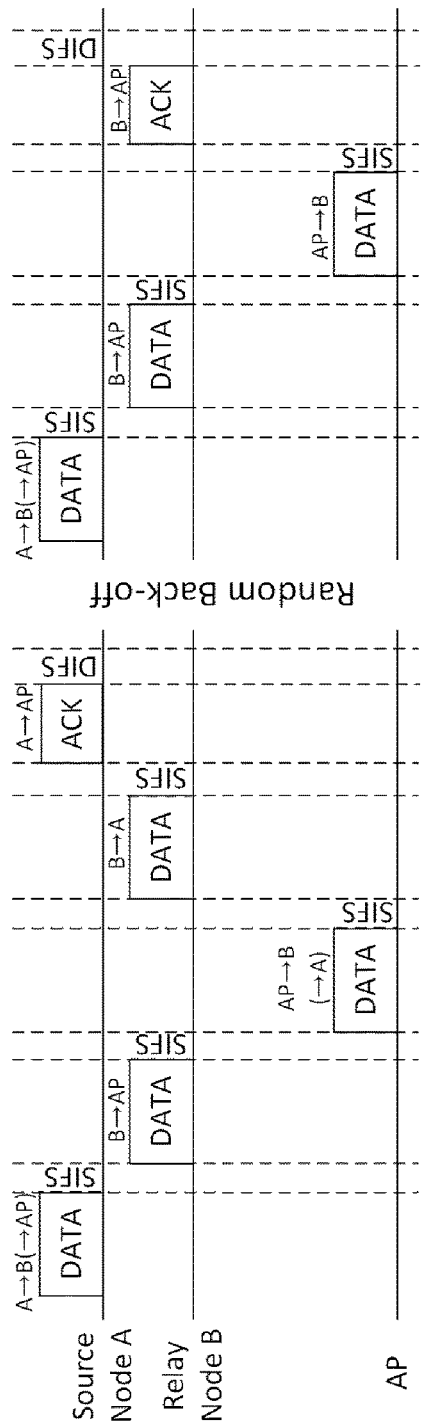
FIG. 10 is a conceptual diagram illustrating downlink relay transmission of an access point and a relay node using multiple transfer rate partitioning and cooperative transmission according to an embodiment of the present invention.

FIG. 10 is a conceptual diagram illustrating the downlink relay transmission of an access point and a relay node using multiple transfer rate partitioning and cooperative transmission according to an embodiment of the present invention.

Referring to FIG. 10, downlink traffic related to a source node having a low speed may increase upon cooperative transmission.

A relay node B having a high speed, which has been set as the relay node for a source node A having a low speed, may receive an uplink packet to be relayed from the source node A to the outside, and, after waiting for the basic waiting time, that is, 1*SIFS, may then transmit the uplink packet to the access point AP.

The access point AP receives the uplink packet from the relay node B, and determines whether downlink data to be downloaded to the source node A or the relay node B is present in the download queue while waiting for the basic waiting time, that is, 1*SIFS. Meanwhile, an uplink packet may be output to the outside according a suitable communication protocol at the suitable time.

If the downlink data to be transmitted to the source node A or the relay node B is present at the access point AP, the access point AP transmits the downlink packet to the relay node B prior to other nodes after the basic waiting time, that is, 1*the SIFS waiting time, has elapsed, instead of waiting for its own transmission time slot to come.

In contrast, when the downlink data to be transmitted to the source node A or the relay node B is not present at the access point AP, the access point AP transmits the ACK packet to the high speed node B after the basic waiting time, that is, 1*the SIFS waiting time, has elapsed.

Accordingly, the relay node B may receive a downlink packet to be downloaded from access point AP to the source node A or the relay node B, or may receive an ACK packet responsive to the transmitted uplink packet after waiting for the basic waiting time, that is, 1*SIFS.

Thereafter, when the relay node B normally receives the downlink packet to be transmitted from the access point AP to the source node A, the relay node B relays the downlink packet to the source node A after waiting for the basic waiting time, that is, 1*SIFS.

The source node A receives the downlink packet through the relaying of the relay node B, and may then transmit the ACK packet to the access point AP after waiting for the basic waiting time, that is, 1*SIFS. This reception acknowledgement packet may be transmitted by the source node A without the intervention of the relay node B.

Meanwhile, when the relay node B normally receives the downlink packet to be transmitted from the access point AP to the relay node B, the relay node B may transmit an ACK packet to the access point AP after waiting for the basic waiting time, that is, 1*SIFS.

The access point AP may remove the downlink data from the download queue after receiving the ACK packet from the source node A or the relay node B.

Figure 11:
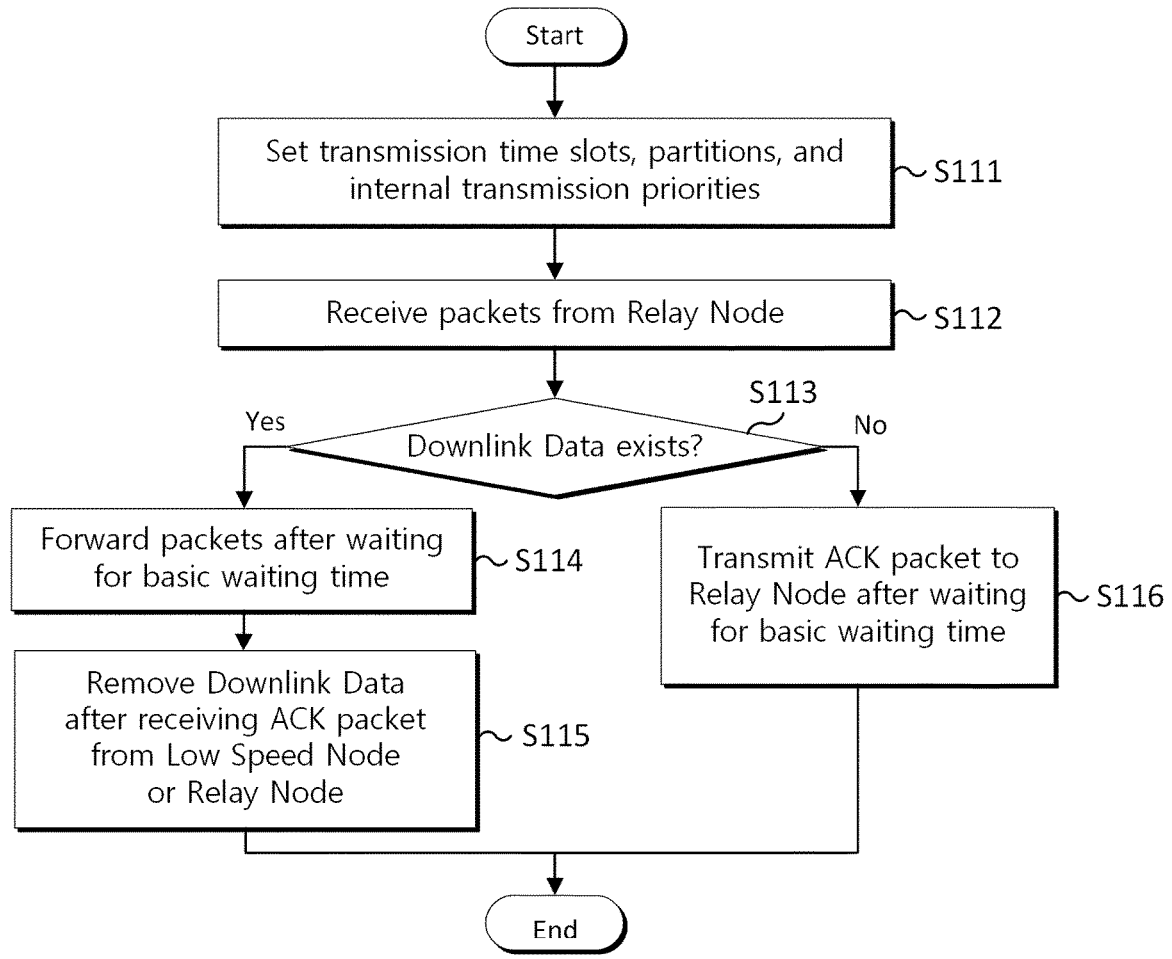
FIG. 11 is a flowchart illustrating a fast WLAN communication method for increasing the amount of downlink relay transmission of an access point and a relay node using multiple transfer rate partitioning and cooperative transmission according to an embodiment of the present invention.

FIG. 11 is a flowchart illustrating a fast WLAN communication method capable of increasing the amount of downlink relay transmission of the access point and the relay node using multiple transfer rate partitioning and cooperative transmission according to an embodiment of the present invention.

Referring to FIG. 11, in accordance with the fast WLAN communication method capable of increasing the amount of the downlink transmission of the access point and the relay node having a high speed using multiple transfer rate partitioning and cooperative transmission, first, at step S111, the access point 11 may transmit a transmission time slot information, a partition information and an internal transmission priority information to the high speed nodes 111 to 118 and the low speed nodes 121 to 123 in order to enable transmission time slots, partitions and internal transmission priorities to be identified.

At step S112, the access point 11 receives an uplink packet from the low speed node 123, that is, any one source node, via the high speed node 111, that is, the relay node.

At step S113, the access point 11 determines whether downlink data to be downloaded to the low speed node 123 or the high speed node 111 is present in the download queue while waiting for the basic waiting time, for example, 1*SIFS.

The process proceeds to step S114 if the access point 11 has the downlink data to be transmitted to the low speed node 123 or the high speed node 111, whereas the process may proceed to step S116 if the access point 11 does not have the downlink data to be transmitted to the low speed node 123 or the high speed node 111.

If it is determined at step S113 that the downlink data to be transmitted to the low speed node 123 or the high speed node 111 is present at the access point 11, the access point 11 transmits the downlink packet to the high speed node 111 after the basic waiting time has elapsed at step S114.

At step S115, the access point 11, after transmitting the downlink packet and receiving the reception acknowledgement packet from the high speed node 111 or the low speed node 123, may remove the downlink data from the download queue.

A reception acknowledgement packet received from the low speed node 123 means that a downlink packet is supposed to be transmitted to the low speed node 123, or that the high speed node 111 receives a downlink packet from the access point 11 and then normally relays the downlink packet to the low speed node 123 and, accordingly, the low speed node 123 transmits the reception acknowledgement packet.

In contrast, A reception acknowledgement packet received from the high speed node 11 means that the downlink packet is supposed to be transmitted to the high speed node 111, or that the high speed node 111 receives a downlink packet from the access point 11 and then transmits the reception acknowledgement packet.

If it is determined at step S113 that the downlink data to be transmitted to the low speed node 123 or the high speed node 111 is not present at the access point 11, the access point 11 transmits a reception acknowledgement packet to the low speed node 123 or the high speed node 111 after the basic waiting time has elapsed at step S116.

Figure 12:
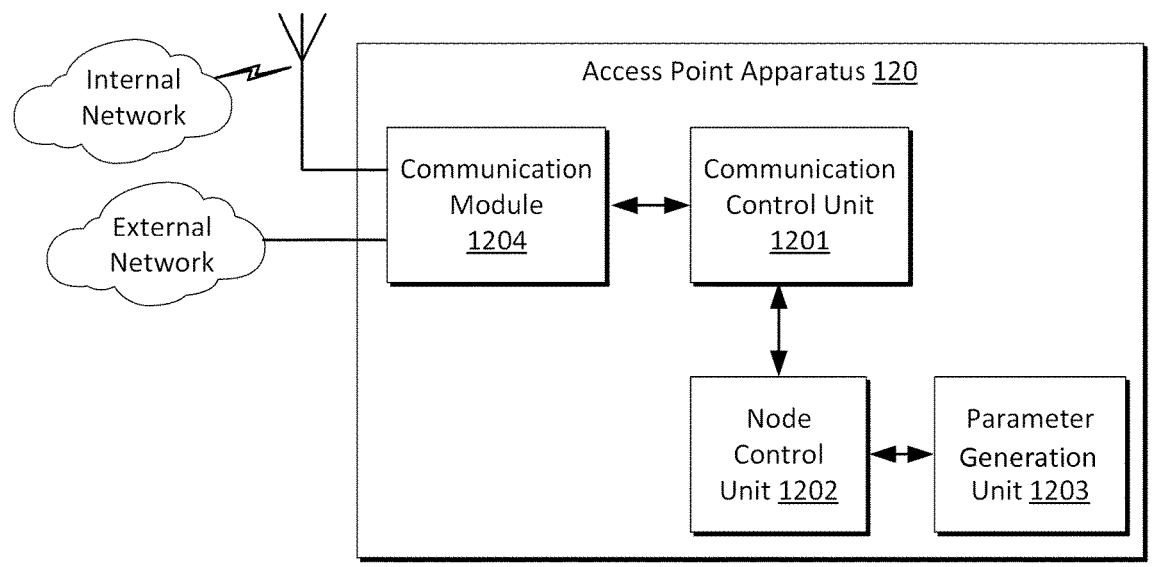
FIG. 12 is a block diagram illustrating an access point device capable of increasing the amount of downlink transmission using multiple transfer rate partitioning and cooperative transmission according to an embodiment of the present invention.

FIG. 12 is a block diagram illustrating an access point device capable of increasing the amount of downlink transmission using multiple transfer rate partitioning and cooperative transmission according to an embodiment of the present invention.

Referring to FIG. 12, the access point device 120 capable of increasing the amount of downlink transmission using multiple transfer rate partitioning and cooperative transmission may include a communication control unit 1201, a node control unit 1202, a parameter generation unit 1203, and a communication module 1204.

The communication control unit 1201 controls transmission and reception of uplink and downlink between the nodes of internal and external network via the communication module 1204 according to wired and wireless LAN communication standards. The communication control unit 1201 may include a download queue that stores downlink data to be transmitted from the outside to the nodes.

More specifically, when the communication control unit 1201 receives an uplink packet, from the high speed node 111, or from the low speed node 123 via the high speed node 111, the communication control unit 1201 determines whether downlink data to be downloaded to the low speed node 123 or the high speed node 111 is present in the download queue while the access point 11 waits for the basic waiting time, for example, 1*SIFS. If the downlink data to be transmitted to the low speed node 123 or the high speed node 111 is present, the downlink packet is transmitted to the high speed node 111 after the basic waiting time has elapsed.

When the communication control unit 1201 transmits the downlink packet and then receives the reception acknowledgement packet from the high speed node 111 or the low speed node 123, the communication control unit 1201 may remove the downlink data from the download queue.

A reception acknowledgement packet received from the low speed node 123 means that the downlink packet is related to data to be transmitted to the low speed node 123, and further, that the high speed node 111 receives a downlink packet from the access point 11 and then normally relays the downlink packet to the low speed node 123, and accordingly, the low speed node 123 transmits the reception acknowledgement packet.

In contrast, a reception acknowledgement packet received from the high speed node 11 means that the downlink packet is related to data to be transmitted to the high speed node 111, and further that the high speed node 111 receives a downlink packet from the access point 11 and then transmits the reception acknowledgement packet.

If it is determined that the downlink data to be transmitted to the low speed node 123 or the high speed node 111 is not present, the communication control unit 1201 transmits a reception acknowledgement packet to the low speed node 123 or the high speed node 111 after the basic waiting time has elapsed.

Meanwhile, the parameter generation unit 1203 may generate a transmission time slot information, a partition information and an internal transmission priority information so that the access point 120 may identify the transmission time slots, partitions and internal transmission priorities of the high speed nodes 111 to 118 and the low speed nodes 121 to 123.

The node control unit 1202 may transmit the generated transmission time slot information, the partition information and the internal transmission priority information to the nodes 111 to 123 via the communication control unit 1201 and the communication module 1204.

The apparatus according to the present invention can be implemented as computer-readable code that can be recorded on a computer-readable storage medium. The computer-readable storage medium can include all types of storage devices on which data that can be read by a computer system is stored. Examples of the computer-readable storage medium include read only memory (ROM), random access memory (RAM), an optical disk, magnetic tape, a floppy disk, a hard disk, and nonvolatile memory, and further include a carrier wave (for example, in the case of transmission over the Internet). Furthermore, the computer-readable medium may be distributed throughout computer systems connected over a network, and thus computer-readable code can be stored and executed in a distributed manner.

The fast WLAN communication method and apparatus using multiple transfer rate partitioning and cooperative transmission according to the present invention have the advantage of reducing frequency collisions among closely located nodes through multiple transfer rate partitioning.

The fast WLAN communication method and apparatus using multiple transfer rate partitioning and cooperative transmission according to the present invention have the advantage of selecting a relay node from among a plurality of nodes, in particular, in a high speed transfer rate partition, thereby the efficiency of cooperative transmission.

The fast WLAN communication method and apparatus using multiple transfer rate partitioning and cooperative transmission according to the present invention have the advantage of combining a multiple transfer rate partitioning technique and a cooperative transmission technique having different purposes and effects together, thereby reducing both performance anomaly and frequency collisions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for communicating in a wireless local area network (WLAN), by an access point (AP), the method comprising:
    allocating a transmission time slot for a group of stations (STAs), which comprises one or more STAs;
    transmitting a beacon frame including transmission time slot information and group information;
    receiving an uplink frame from a STA of the group of STAs within the transmission time slot; and
    transmitting an acknowledgement frame in response to the uplink frame to the STA within the transmission time slot,
    wherein the transmission time slot information indicates a time duration allocated to the group of STAs within a beacon interval between two consecutive beacon frames,
    wherein the group information indicates the one or more STAs belonging to the group of STAs,
    wherein the STA is assigned a corresponding partition, within the transmission time slot, to access a medium in contention, and
    wherein the acknowledgement frame is transmitted in same partition as the corresponding partition assigned to the STA.

2. The method of claim 1, wherein the group is configured to comprise an STA set to an equal transfer rate by grouping all of STAs connected to the AP according to transfer rates.

3. The method of claim 1, wherein the beacon frame comprises internal transmission priority information,
    the internal transmission priority information indicates a priority for transmission of the STA belonging to the group within the allocated transmission time slot.

4. The method of claim 3, the uplink frame is transmitted according to the priority for transmission of the STA belonging to the group in a non-contention manner.

5. An access point (AP) for communication in a wireless local area network (WLAN), comprising:
    a radio frequency (RF) unit for sending and/or receiving radio signals; and
    a processor,
    wherein the processor is configured to allocate a transmission time slot for a group of stations (STAs), which comprises one or more STAs, and to transmit a beacon frame including transmission time slot information and group information to receive an uplink frame from a STA of the group of STAs within the transmission time slot and transmit an acknowledgement frame in response to the uplink frame to the STA within the transmission time slot,
    wherein the transmission time slot information indicates a time duration allocated to the group of STAs within a beacon interval between two consecutive beacon frames,
    wherein the group information indicates one or more STAs belonging to the group of STAs,
    wherein the STA is assigned a corresponding partition, within the transmission time slot, to access a medium in contention, and
    wherein the acknowledgement frame is transmitted in same partition as the corresponding partition assigned to the STA.

* * * * *